United States Patent [19]

Sauer et al.

[11] Patent Number: 5,021,306
[45] Date of Patent: Jun. 4, 1991

[54] SPIRAL-WOUND GALVANIC CELL

[75] Inventors: Hans Sauer, Idstein-Walsdorf; Peter Kramer, Konigstein, both of Fed. Rep. of Germany

[73] Assignee: Varta Batterie Aktiengesellschaft, Hanover, Fed. Rep. of Germany

[21] Appl. No.: 436,650

[22] Filed: Nov. 15, 1989

[30] Foreign Application Priority Data

Jan. 30, 1989 [DE] Fed. Rep. of Germany ....... 3902648

[51] Int. Cl.⁵ .............................................. H01M 2/30
[52] U.S. Cl. ...................................... 429/94; 429/178
[58] Field of Search ........................... 429/94, 178, 121

[56] References Cited

U.S. PATENT DOCUMENTS

| | | | |
|---|---|---|---|
| 3,212,935 | 10/1965 | Reilly et al. | 429/165 |
| 3,775,182 | 11/1973 | Patton et al. | 429/94 |
| 3,796,606 | 3/1974 | Lehmann et al. | 429/94 |
| 4,091,181 | 5/1978 | Merritt, Jr. | 429/94 |
| 4,259,416 | 3/1981 | Ikeda et al. | 429/94 |
| 4,709,472 | 12/1987 | Machida et al. | 429/94 X |

FOREIGN PATENT DOCUMENTS

| | | | |
|---|---|---|---|
| 123428 | 8/1947 | Austria | 429/94 |
| 967636 | 5/1975 | Canada | 429/94 |
| 0066270 | 4/1983 | Japan | 429/94 |

*Primary Examiner*—Anthony Skapars
*Attorney, Agent, or Firm*—Weiser & Stapler

[57] ABSTRACT

A spiral-wound galvanic cell is based upon a lithium system with a nonaqueous electrolyte, and includes a positive electrode, the carrier of which is clamped within the slit of a simple metal splint which serves as the winding mandrel and current collector. Contact with the metal splint is established by a leaf spring associated with the housing cover, which then serves as the positive terminal post for the cell. A high specific contact pressure is developed at this connection by providing the leaf spring with a punched hole which rests on thicker top portions of the metal splint. A small metal plate pressed through the lithium electrode and its separator establishes electrical contact between the lithium electrode and the interior wall of the housing vessel, which then serves as the negative cell pole.

8 Claims, 2 Drawing Sheets

SPIRAL-WOUND GALVANIC CELL

BACKGROUND OF THE INVENTION

The present invention relates generally to a galvanic cell with a spiral-shaped electrode body, and more particularly, to an improved center pole conductor for such a cell, and its use in facilitating the winding procedure.

Spiral-wound galvanic cells are generally produced from windings of band-shaped positive and negative electrodes, with the imposition of a band-shaped separator, together with an appropriate current collector. A metal housing is provided to receive the spiral electrodes, one of which is electrically connected to the metal housing. The other electrode is electrically connected with a cover, which seals the opening of the housing and which serves as a terminal post for the associated electrode.

The conventional process for producing electrode windings of this general type makes use of a winding mandrel, usually a steel needle of about 5 to 7 mm in diameter, having a longitudinal slit which is used to engage the band electrodes. In most instances, this mandrel is permanently attached to the winding machine. Consequently, in operation, a free space is generally left in the middle of the electrode winding after its production, following withdrawal of the mandrel of the winding machine.

This free space, under certain circumstances (e.g., impact stressing of the cell), can lead to a displacement of the windings along the longitudinal axis of the cell, or even a mutual displacement of the electrodes. Attempts have been made to overcome this problem by using winding mandrels formed of plastic rods, which are designed to fill the free space in the electrode winding and provide a so-called "lost nucleus" for permanently positioning the windings (forming the basis for a compact arrangement of the electrodes).

However, in any event, it remains necessary to provide 10 the individual electrodes with separate current-conducting lugs, and to connect the lugs to their external cell poles (advantageously formed by the cell housing and cover). The production of such connections (which frequently must take the form of wire bridges) is rather difficult. What is more, a considerable transfer resistance can develop in the event of a faulty weld.

DE-C-2 438 296 discloses a somewhat more advantageous arrangement in which at least one electrode is connected to its respective terminal post by means of a terminal collector plate. However, such measures are only effective when the electrodes (e.g., a sintered foil strip) are not edged with an active paste, which could come into contact with the plate on the front side of the winding. DE-A-3 412 890, as well as DE-C-3 014 435, disclose wound electrode structures in which a winding core, originally used to produce the set of electrodes, also assumes the role of a terminal collector pole, as a current collector for a first one of the electrodes, while the housing serves as the terminal collector for the second electrode. However, the second electrode must then form the external side of the winding so that it can rest against the inner wall of the housing. DE-C-3 014 435 further discloses the placement of a coil spring onto the flange-like upper end of the cell's rod-like collector, which presses against the lower side of the metallic cell cover and accordingly establishes an electrical connection between the collector and its external pole. However, during assembly, this 10 spring requires special attention, particularly in its positioning on the head of the collector, since there is a danger that the coil spring will fly loose as the result of unintentional squeezing by the tool which is used to manipulate it. Such measures have therefore not proved to be entirely satisfactory.

SUMMARY OF THE INVENTION

It is therefore a primary object of the present invention to provide an improved current collector for a spiralwound galvanic cell.

It is also an object of the present invention to provide a current collector for a spiral-wound galvanic cell which is simple in construction, and in its manner of use.

It is also an object of the present invention to provide a current collector for a spiral-wound galvanic cell which can simultaneously serve as a winding mandrel for producing the cell.

It is also an object of the present invention to provide a current collector for a spiral-wound galvanic cell which can provide a trouble-free electrical connection with the cell's housing cover, to serve as an external cell pole for the associated electrode.

It is also an object of the present invention to provide a spiral-wound galvanic cell having an improved current collector, and which is easy to assemble.

These and other objects are achieved in accordance with the present invention by providing a current collector for one of the cell's electrodes, preferably the positive electrode, which takes the form of a slit metal needle for receiving the electrode, along its carrier. The body of the needle is slit so that the electrode is permanently clamped to the current collector. The top of the needle is closed so that the needle can be firmly grasped by the winding machine. The overall shape and/or thickness of the needle may be varied. However, the length of the slit preferably conforms to the width of the electrode band so that there is optimum contact of the carrier with the slit body of the needle, on both sides. In a particularly preferred embodiment of the present invention, the slit needle takes the form of a metal splint (much like a cotter pin) with a closed top end which extends into an eye. In such case, the two legs of the splint can be of a different length, if desired.

To establish electrical contact, it is simply sufficient to place the collector or metal splint onto exposed (freed of active material) portions of the carrier for the electrode, which generally takes the form of an expanded metal or fine mesh net of Ni, Ag, Ti, or nonoxidizing steel. An additional spot welding on either, or preferably both sides of the metal splint, above the intervening carrier, is advantageous and therefore also preferred.

In a particularly preferred embodiment of the invention, the current collector is mounted about the midpoint of the carrier, rather than at one end, so that the electrode band which issues from the middle strip of the carrier (which is freed of active material to establish proper contact with the collector) is divided into two cathode segments of about equal length. As a result of this, the beginning of the winding for this electrode is developed at the middle of the band, providing advantages both in the winding process as well as the electrical properties of the resulting electrode.

The slit needle then remains in the wound electrode, after the winding process. This not only represents a lostnucleus winding needle, but further provides a lowcost grounding component which exhibits simplicity as well as trouble-free mounting.

To establish contact between the current collector of the present invention and the cell's housing cover, a leaf spring is mounted to the interior side of the housing cover, and protrudes downwardly at an angle which causes the leaf spring to rest against the top of the collector, remaining in position under elastic tension in the assembled cell. Again, the use of a metal splint having an eye in its top side is preferred since the leaf spring can then be provided with a punched aperture having a diameter which is smaller than the eye of the metal splint, so that the aperture of the leaf spring can then rest on the eye of the splint collector such that the punched edge can develop a high specific contact pressure. As a result, even with the strongest shaking of the cell, this arrangement operates to dependably prevent a degradation of the resulting electrical contact.

For further detail regarding the improvements of the present invention, reference is made to the description which is provided below, taken in conjunction with the following illustrations.

BRIEF DESCRIPTION OF THE DRAWINGS

In the several views provided, like reference numbers denote similar structure.

DETAILED DESCRIPTION OF PREFERRED EMBODIMENTS

Figure 1:
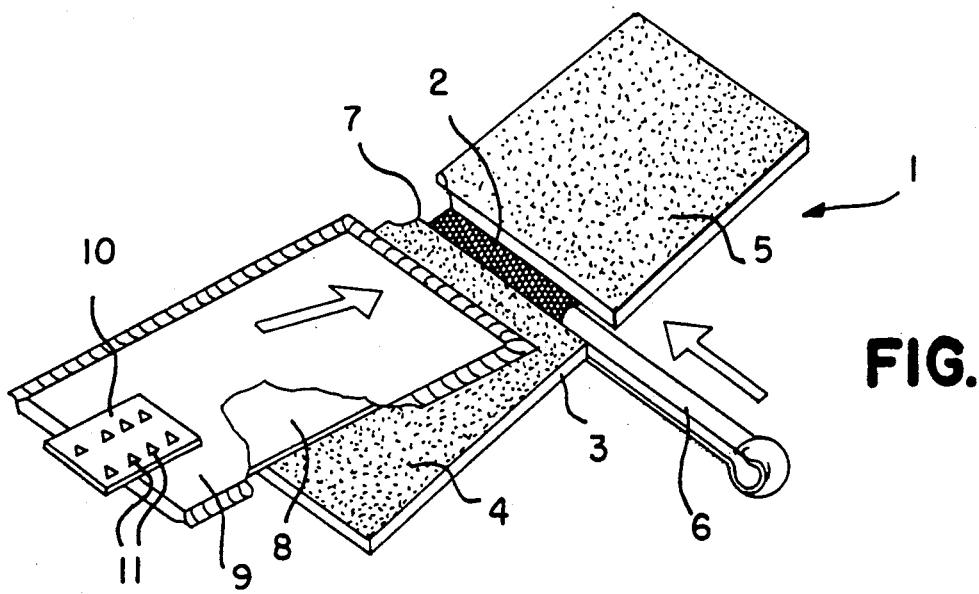
FIG. 1 is an isometric view showing components of an electrode produced with a splint collector according to the present invention, before winding.

FIG. 1 shows the basic components of a spiral-wound electrode structure for a galvanic cell in accordance with the present invention The electrochemical system employed by the illustrated galvanic cell preferably takes the form of a lithium system with a nonaqueous electrolyte. As cathode-active substances, heavy metal oxides and sulfides such as $Ni(OH)_2$, $CuO$, $CrO_x$, $FeS_2$ or $MnO_2$, can be used. The cathode paste is produced, for example, from $MnO_2$ combined with a bonding agent of PTFE powder and graphite as a conducting medium. This is generally accomplished by means of a simple dry-mix process. The cathode band is produced by rolling the dry mixture into a metal net or expanded metal web, as a dry material in a continuous process. Using this process, the paste material is easily removed from the carrier at each of the intended splint contact points, even before it is cut into desired strip lengths. Compressed air is suitably employed for this purpose.

This "dry" procedure avoids not only the disadvantages associated with a wet chemical paste preparation, but has the further advantage of developing a greater porosity in the finished rolled electrode. This increased porosity permits the electrode to be loaded with at least a 50% increase in current density, as compared to an electrode produced by the wet process. The result of this is that with a predetermined (equal) load, an electrode produced with a dry-mix process has a greater capacity, consumes less of the carrier material, can employ less separator material, and is associated with less lithium excess. The costs are correspondingly lowered.

The band-shaped lithium electrode 1 is basically produced in the same manner as other familiar wound cells, and is encased in a tube-shaped sheath of polyethylene or polypropylene (not shown) with sealed edges. The carrier 2 of the band electrode 1 is exposed, preferably at the middle of the band, by removing the rolled positive paste 3 which then covers the carrier 2, so that the resulting band electrode 1 is comprised of a pair of cathode halves 4, 5. The metal splint 6 is then inserted over the exposed carrier section, establishing frictional contact with the engaged carrier 2. If desired, the splint 6 can be spot welded to the carrier 2 following this placement. The electrode 1 is provided with a notch 7 so that the lower end of the splint 6 can be accessed with a cutting tool to remove any portions of the splint 6 which may project beyond the winding to be produced, so as to avoid damage to the winding.

Figure 2:
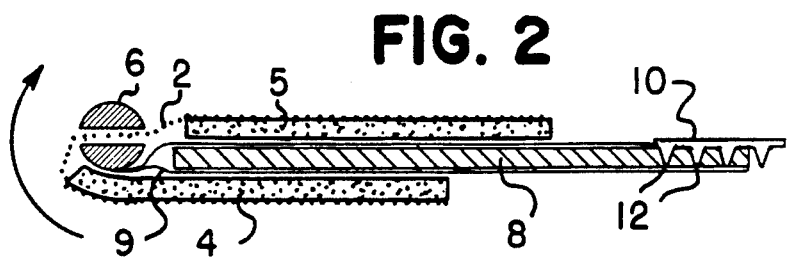
FIG. 2 is a cross-sectional view showing coiling of the electrode components around the metal splint, at the beginning of the winding procedure.

Referring now to FIG. 2, the metal splint 6 serves primarily as a winding needle (mandrel). Before winding, the band electrode 1 is folded (together with its paste covering) in an inward direction across the intervening lithium electrode 8, which abuts the winding needle 6 at the front side edge of its separator casing 9. To ensure a proper winding, the length of the negative band electrode 8, or at least that of the separator sleeve 9, must be such that it exceeds the length of the positive electrode 1, when folded, at least by a length equal to the circumference of the finished winding. This is also true when both of the electrodes 1, 8 are rolled up from their ends. In such case, the positive electrode 1, for reasons of capacity expansion, must further have what amounts to about a doubled thickness (e.g., about twice an electrode held in the middle of the band by the current collector).

The end of the negative electrode 8 is provided with a contact element 10. As shown, this takes the form of a thin, small metal plate, having punched holes 11 which serve to develop pointed burrs 12 (evident in FIG. 2) which can penetrate the lithium electrode, including the separator, when the contact element is compressed. During the subsequent positioning of these components in the housing vessel, the burr points 12 protruding from the lower side of the negative electrode 8 will further operate to engage (claw) the wall of the cell housing and provide the lithium electrode with a positive electrical connection with the housing wall.

The special advantages associated with the division of the cathode band into two band segments, and with the attachment of the splint collector at the middle of the band, come into play during the winding process (which is conventionally supported from beginning to end by a housing jig from which the finished winding can then be ejected and immediately transferred to the waiting cell housing). As is best shown in FIG. 2, by dividing the cathode band into two relatively thin halves 4, 5, instead of an equally long but twice as thick electrode plate 1, a greater flexibility in the band is achieved so that both parts can displace each other, and their front ends, carrying with them the interposed lithium electrode 8 enclosed by the separator 9. Once wound, these components are then reliably held by the rolled up splint 6. Moreover, the three-tiered electrode arrangement of the resulting winding is gradually built up during the winding process, which facilitates a tighter winding radius and a better utilization of the space of the housing vessel. What is more, the danger of having the active paste peel off is reduced with a thinner cathode, or with a cathode that is wound from its middle. A further advantage of a "double cathode" wound from the middle is that the cathode will then discharge through the intervening lithium electrode band from both sides of the layered winding, and not just on the power-shielded side.

Figure 3:
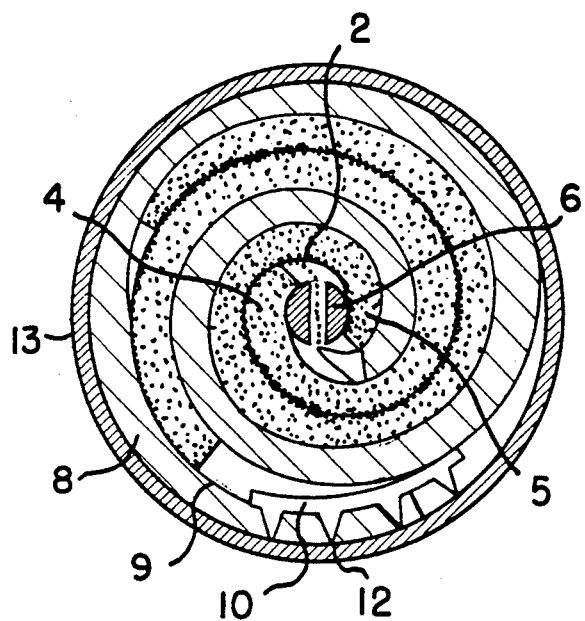
FIG. 3 is a cross-sectional view of a cell containing a finished electrode winding.

FIG. 3 provides a cross-sectional illustration of the wound cell of the present invention. Centrally located is the positive splint collector 6 (and the winding needle). Extending outwardly from the center, in a spiral, are the partial cathode 4, the partial cathode 5, and the lithium electrode 8 (packed in the separator sleeve 9). The housing vessel 13 then operates to contain these various components, as previously described. Thus, the two partial cathodes 4, 5 are positioned with their carriers back to back, and with their "layer sides" turned toward the lithium electrode. FIG. 3 also clearly illustrates contact of the lithium electrode 8 with the vessel wall 13 using the contact 10, and the claws 12 of the contact 10 which are pressed through the lithium band and the separator casing.

Referring now to FIG. 4, it is also possible for the band electrode 1 to be rolled up from its end using the splint collector 6 of the present invention. In such case it is advantageous to place the splint collector 6 somewhat inwardly from the end of the band, over the carrier as previously described, and to provide a free end on the separator casing 9 of the counter-electrode 8 (i.e., the Li electrode), the length of which preferably corresponds approximately to the short band end of the electrode 1. The counter-electrode 8 is then placed on the band electrode 1, so that the free end of the separator casing 9 is positioned with its front edge lying along the winding needle 6, or abutting against it. The end of the separator is then overlapped by the short end section of the band electrode 1 as it is pivoted 180°, and finally clamped between these two parts of the band electrode 1. This ensures that the counter-electrode 8 is dependably retracted upon rotation of the needle 6, so that the electrodes are rolled up in trouble-free fashion, one over the other.

Figure 4A:
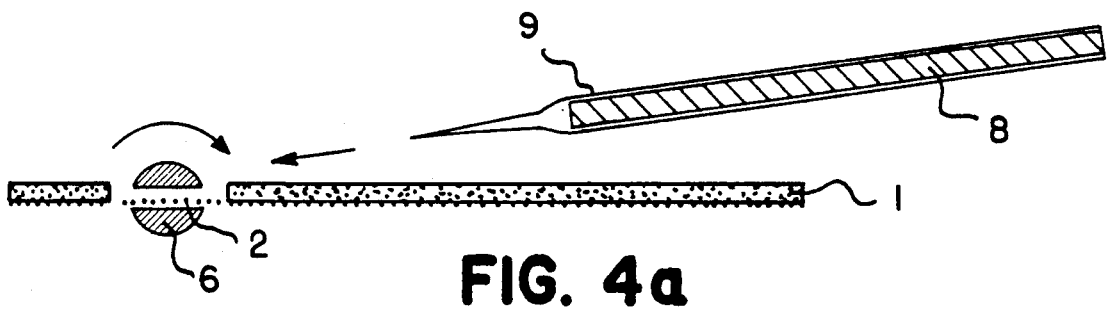
FIG. 4 diagrammatically illustrates an alternative winding procedure in accordance with the present invention.
Figure 4B:
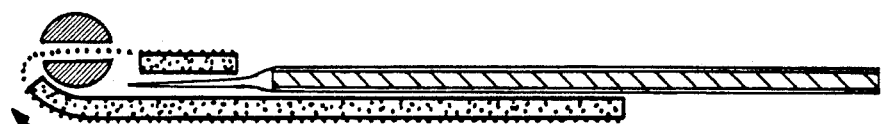
Figure 4C:
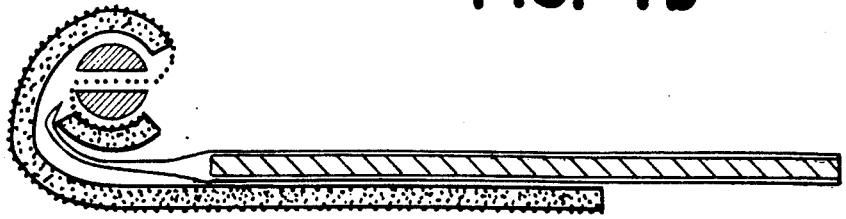

Such a winding process is schematically shown in Figure 4 of the drawings. FIG. 4a shows the cathode 1 engaged by the winding needle 6, and the lithium electrode 8 in its initial position. FIG. 4b shows the winding needle 6 following a completed half revolution relative to FIG. 4a. FIG. 4c shows the electrode structure following a full revolution of the winding needle 6. Resulting from the displacement of the winding needle 6 from the end of the cathode band, and the peak-shaped form of the illustrated cathode band, trouble-free winding with a tight starting radius is made possible.

Figure 5:
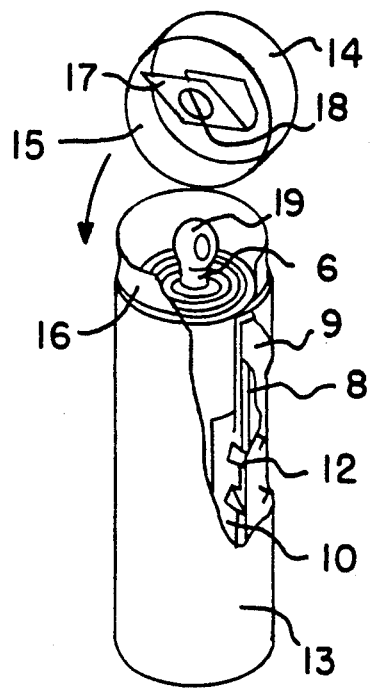
FIG. 5 is a partially sectioned, isometric view of a galvanic element produced according to the present invention, with the end cap removed to show construction detail.

Referring now to FIG. 5, covering of the cell is simply performed making use of a sleeve cowling. To facilitate this, either the interior rim 15 of the cap 14, or the exterior wall of the vessel's collar 16, is provided with a plastic coating so that the pressed cap (following electrolyte filling) seals the vessel with a solid force fitting. At the same time, a leaf spring 17 welded to the cap 14, and preferably the punched burrs of a hole 18 formed in the leaf spring 17, are brought to rest on the eye 19 of the splint collector 6. Even when placed under a high continuous voltage, this serves to ensure a positive electrical contact between the splint collector 6 and the metal cap 14, which then serves as the positive external pole for the resulting cell.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A galvanic cell comprising a spiral-shaped electrode body which is formed from windings of band-shaped positive and negative electrodes with the imposition of a band-shaped separator, a current collector which serves as a winding mandrel and which is electrically connected with a first of said electrodes, wherein said current collector is a metal needle having a slit clamped to carrier portions of said first electrode, a metal housing for receiving the spiral-shaped electrode body and which is electrically connected with a second one of said electrodes, a cover which seals the opening of the housing and which serves as a terminal post for the electrode which is electrically connected to the current collector, and a contact for bridging the cover and the current collector, wherein said contact takes the form of a leaf spring attached to interior portions of the cover and which rests upon the current collector under elastic tension.

2. The galvanic cell of claim 1 wherein the current collector is a metal splint having a closed top end which is shaped into an eye.

3. The galvanic cell of claim 2 wherein the leaf spring includes an aperture having a diameter which is smaller than the eye of the metal splint, so that the aperture of the leaf spring rests against the eye of the metal splint under high specific contact pressure.

4. The galvanic cell of claim 1 wherein the leaf spring includes means for positioning the current collector within said galvanic cell.

5. The galvanic cell of claim 4 wherein said positioning means is an aperture formed in the leaf spring for engaging end portions of the current collector.

6. A galvanic cell comprising a spiral-shaped electrode body which is formed from windings of band-shaped positive and negative electrodes with the imposition of a bandshaped separator, a current collector which serves as a winding mandrel and which is electrically connected with a first of said electrodes, wherein said current collector is a metal needle having a slit clamped to carrier portions of said first electrode, a metal housing for receiving the spiral-shaped electrode body and which is electrically connected with a second one of said electrodes, a cover which seals the opening of the housing and which serves as a terminal post for the electrode which is electrically connected to the current collector, and a flexible contact for bridging the cover and the current collector having means for positioning the current collector within the galvanic cell, wherein said contact takes the form of a leaf spring attached to interior portions of the cover and which rests upon the current collector under elastic tension.

7. The galvanic cell of claim 6 wherein the current collector is a metal splint having a closed top end which is shaped into an eye.

8. The galvanic cell of claim 7 wherein the positioning means is an aperture formed in the leaf spring and having a diameter which is smaller than the eye of the metal splint, so that the aperture of the leaf spring rests against the eye of the metal splint under high specific contact pressure.

* * * * *